(12) United States Patent
Feinberg

(10) Patent No.: US 6,658,935 B1
(45) Date of Patent: Dec. 9, 2003

(54) COMPLEMENTED ABSOLUTE/RELATIVE FULL-TENSOR GRAVITY GRADIOMETER SYSTEM

(75) Inventor: Melvin Feinberg, Huntington, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 36 days.

(21) Appl. No.: 09/987,730

(22) Filed: Nov. 15, 2001

Related U.S. Application Data

(60) Provisional application No. 60/273,519, filed on Mar. 7, 2001.

(51) Int. Cl.$^7$ .................................................. G01V 7/14
(52) U.S. Cl. ...................................... 73/382 G; 73/1.38
(58) Field of Search ........................... 73/382 G, 382 R, 73/1.38, 1.37; 702/2

(56) References Cited

U.S. PATENT DOCUMENTS

| | | | |
|---|---|---|---|
| 5,339,684 A | * | 8/1994 | Jircitano et al. .......... 73/178 R |
| 5,734,104 A | * | 3/1998 | Panenka .................... 73/382 G |

* cited by examiner

*Primary Examiner*—John E. Chapman
(74) *Attorney, Agent, or Firm*—Wallace G. Walter

(57) ABSTRACT

A complemented absolute/relative full-tensor gravity gradiometer system utilizes an absolute gravity instrument and a relative gravity gradiometer to provide respective outputs corresponding to components of the gravity gradient tensor to verify the relative gravity gradiometer and effect correction/compensation thereof.

1 Claim, 4 Drawing Sheets

$$\Gamma_{i,j} = \begin{bmatrix} \Gamma_{xx} & \Gamma_{xy} & \Gamma_{xz} \\ \Gamma_{yx} & \Gamma_{yy} & \Gamma_{yz} \\ \Gamma_{zx} & \Gamma_{zy} & \Gamma_{zz} \end{bmatrix}$$

COMPLEMENTED ABSOLUTE/RELATIVE FULL-TENSOR GRAVITY GRADIOMETER SYSTEM

CROSS REFERENCE TO PROVISIONAL PATENT APPLICATION

The application claims the benefit of U.S. Provisional Patent Application No. 60/273,519 filed by the present inventor on Mar. 7, 2001 and in common assignment herewith.

BACKGROUND OF THE INVENTION

The earth's gravitation field varies between a low of about 880 mgals at the equator to about 1,100 mgals at the poles with gradients characterized in Eotvos units, where one Eotvos unit equals $10^{-9}\sec^{-2}$. For an idealized homogeneous sphere, an equipotential surface outside of the sphere is also spherical, and, for any relatively small volume unit in free space, an idealized gravity field can be viewed as a set of unidirectional field lines aligned along the local vertical and having zero magnitude in the x,y directions. In the context of a geoshpere such as the earth, density inhomogeneities in the geosphere give rise to an equipotential surface that is not spherical, i.e., the curvature of any point is different in different directions. In the context of the earth, local variations in gravity are caused by deviations in the surface of the earth from a geometric sphere, surface geology, water tides, atmospheric tides, and the change in relative position of the earth, the moon, and the sun.

For any observation point within an arbitrary volume unit, the gravity field at that observation point can be resolved into x,y,z components of which the z vector will have the largest magnitude and the x,y vectors will have respective magnitudes that are a function of the location of that observation point relative to any mass inhomogeneities.

FIG. 1 illustrates a conventional coordinate system in which the X axis corresponds to the north-south alignment, the Y axis corresponds to the east-west alignment, and the Z axis corresponds to the up-down alignment. Using this coordinate system convention and for any observation point, the gravity gradient is a second order derivative of the gravity potential scaler $\Gamma$ and is represented by a second-order nine-component symmetric tensor $\Gamma_{ij}$ as shown in FIG. 2.

The components $\Gamma_{x,x}$ and $\Gamma_{y,y}$ are approximately equal to the variation of the force of gravity along the x and y directions, respectively, and are known as the horizontal gradient components, and $\Gamma_{z,z}$ is known as the vertical gradient of gravity. Three pairs of the nine elements are symmetrically equal, i.e., $\Gamma_{x,z}=\Gamma_{z,x}$, $\Gamma_{y,z}=\Gamma_{z,y}$, and, lastly, $\Gamma_{x,y}=\Gamma_{y,x}$ so that the tensor is characterized by five independent components. Additionally, the diagonal elements are scalar invariant and conform to the Laplacian relationship:

$$0=\Gamma_{x,x}+\Gamma_{y,y}+\Gamma_{z,z} \qquad \text{EQ. 1}$$

from which it follows that:

$$\Gamma_{z,z}=-(\Gamma_{x,x}+\Gamma_{y,y}) \qquad \text{EQ. 2}$$

Two general types of instruments, characterized in a generic sense as "absolute" and "relative" instruments, have been developed for measuring, directly or indirectly, the various components within the gravity tensor.

In general, the gravity field along the z axis can be measured by uniaxis gravimeters of which a common type uses lasers and a high-precision clock to time a mass falling between two vertically spaced points in an evacuated space. Gradiometers, as distinguished from gravimeters, measure the curvature gradients (or differential curvature or ellipticity of the gravity equipotential surfaces), horizontal gradients (or the rate of change of the increase of gravity in the horizontal direction), or vertical gradients (or the rate of increase of gravity in the vertical direction).

An absolute gravity instrument that relies on the direct measurement of a mass whose movement is a function the of gravity field is disclosed in U.S. Pat. No. 5,351,122 issued Sep. 27, 1994 to T. Niebauer et al. As disclosed therein, the instrument utilizes a reflective mass that is dropped under the influence of gravity. The motion of the free-falling reflective mass is measured using a split-beam laser interferometer by which light from a laser is split into two paths with light from one of the paths reflected from the free-falling reflective mass and the reflected light compared with light from the other path. Since the instrument is relatively simple and the falling mass is influenced directly by the gravity field, the value of gravity can be accurately calculated using Newtonian principles.

A more sophisticated absolute gravity measuring instrument is disclosed in U.S. Pat. No. 5,892,151 issued Apr. 6, 1999 to T. Niebauer et al. which discloses the use of two physically spaced-apart falling body sensors to obtain a differential measurement of gravity. Where two of the sensors are spaced apart from one another along the vertical axis, differences in the measured output of sensors represents the component $\Gamma_{z,z}$ of the gravity tensor. The differential instrument is well-suited for use in those applications in which differential gravity measurement are desired, including mineral and petroleum exploration and extraction.

In contrast to the falling-body absolute gravity instruments, one type of relative instrument utilizes plural pairs of accelerometers that are moved at a constant velocity along an orbital path about a spin axis. Information from each accelerometer at any angular position in the orbit provides information as to the lateral acceleration, including the gravity field, sensed by the accelerometers. A representative relative instrument is disclosed in U.S. Pat. No. 5,357,802 issued Oct. 25, 1994 to Hofmeyer and Affleck and entitled "Rotating Accelerometer Gradiometer" and sold in various forms by the Lockheed Martin corporation (Buffalo N.Y. USA). The Lockheed Martin instrument is designed to measure the local gravity gradient and includes plural pairs of accelerometers mounted at a common radius and equi-spaced about the periphery of a rotor assembly that is rotated at a constant and controlled angular velocity about a spin axis.

Each accelerometer provides a sinusoidally varying analog output that is a function of the acceleration experienced by each accelerometer as the accelerometer orbits the spin axis. For a gradiometer having its spin axis aligned along the field lines in an ideally uniform and unperturbed gravity field, each accelerometer experiences the same acceleration forces as its proceeds along its orbital path. However, where the local gravity field is perturbed by the presence of one or more masses and/or the spin axis is tilted relative to the local vertical field lines, each accelerometer will experience different accelerations throughout its orbit. The quantitative output of each accelerometer, coupled with its rotary position, provides information related to the local gravity gradients.

Gradiometers of the type that employ orbiting accelerometers must use accelerometers with precisely matched physical properties, matched scale factors, various servo loops that are linear and stable, and numerous other control and feedback loops that must remain uniformly stable with time. Various signal processing techniques, principally common mode rejection techniques, have been used to reduce and minimize errors sources to improve measurement accuracy. Errors sources include mis-matched scale factors, motor and bearing vibration, stray electromagnetic fields, and the usual array of electronic noise sources. Because of the complexity of accelerometer-type gradiometers, the accuracy and repeatability of the devices are strongly influenced by temperature, pressures, and duration of service requiring periodic instrument calibrations and monitoring of time-dependent drift errors. Additionally, the overall instrument transfer function is frequency dependent and includes specific frequencies for which the instrument is maximally sensitive. At these frequencies, it can be difficult to separate information in the output power spectrum that represents the desired gravity information and non-information noise. Since the accelerometers in these types of gradiometers do not directly measure gravity in the same direct manner as a falling-body instrument, the output can only be characterized in the context of a relative difference.

SUMMARY OF THE INVENTION

In view of the above, it is an object of the present invention, among others, to provide a complemented absolute/relative full-tensor gravity gradiometer system having enhance functionality and measurement veracity.

It is another object of the present invention to provide a complemented absolute/relative full-tensor gravity gradiometer system using a gradiometer and a gravimeter to provide enhanced accuracy outputs.

The present invention provides a complemented absolute/relative full-tensor gravity gradiometer system by which two different types of instruments, neither of which measures the full gravity tensor and which have different error sources, provide their respective partial gravity tensor outputs to construct a composite full gravity tensor in which selected gravity components within the composite tensor are compared for the purpose of monitoring that instrument having the larger number of error sources to enhance the reliability of the output of that instrument.

In the preferred form of the invention, an absolute gravity instrument, which depends upon direct measurement of a moving mass, provides partial gravity tensor outputs that have a high degree of repeatability, low error sources, and provide outputs that are quantifiable by Newtonian rules. A relative gravity instrument, such as a gradiometer, also provides its particular partial gravity tensor outputs. Based upon known mathematical relationships within the tensor, including equalities between off-diagonal components of the tensor and the zero-sum relationship of the in-line diagonal components, the outputs of one instrument can verify the reasonability of the output of the other instruments and be used to identify out-of-calibration operation of the other instrument.

In the preferred embodiment of the present invention, an absolute gravity instrument of the type that utilizes a reflective body that free-falls in a drop zone is complemented with a relative gravity instrument that utilizes orbiting accelerometer pairs to provide relative gravity information. The absolute gravity instrument can include at least two sensors that are vertically spaced, one above the other, to provide the $\Gamma_{z,z}$ component of the gravity gradient and other sensors that are laterally spaced therefrom to provide the $\Gamma_{z,k}$ and $\Gamma_{z,y}$ components. Since the free-falling reflective mass of each sensor is directly influenced by gravity and the measurement is optical, the gravity values are quantifiable using Newtonian principles and information outputs of the absolute gravity instrument can be considered to be an absolute gravity measurement with minimal noise and errors sources. Concurrently, the relative gravity instrument provides its output contributions to the gravity tensors, i.e., the $\Gamma_{x,x} \Gamma_{x,y}$ $\Gamma_{x,z} \Gamma_{y,x} \Gamma_{y,y}$ and $\Gamma_{y,z}$ components.

The known equalities of various off-diagonal components of the gravity tensor (e.g., $\Gamma_{x,z}=\Gamma_{z,x}=\Gamma_{y,z} \Gamma_{z,y}$, and $\Gamma_{x,y}=\Gamma_{y,x}$) and the zero-sum relationship of the diagonal components ($\Gamma_{x,x}+\Gamma_{y,y}+\Gamma_{z,z}=0$) are used with respective device outputs to increase the reliability, repeatability, and reasonableness of the output of the relative gravity instrument. Thus, the $\Gamma_{y,z}$ output of the absolute instrument is compared to the $\Gamma_{z,y}$ output of the relative instrument and any inequalities therebetween used to evaluate, correct, or compensate the output of the relative instrument. In a similar manner, the $\Gamma_{z,x}$ output of the absolute instrument is correlated or compared against the $\Gamma_{x,z}$ output of the relative instrument and any inequalities therebetween use to evaluate, correct, or compensate the output of the relative instrument. Additionally, the $\Gamma_{z,z}$ output of the absolute instrument is checked against the sum of the $\Gamma_{x,x}$ and $\Gamma_{y,y}$ outputs as a way of checking the reasonableness of the outputs of the relative instrument.

The present invention advantageously provides a complemented absolute/relative full-tensor gravity gradiometer system in which the gradiometer and the gravimeter components of the system provide accuracy-enhanced outputs.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

The present invention is described below, by way of example, with reference to the accompanying drawings, wherein.

DESCRIPTION OF THE PREFERRED EMBODIMENT

Figures 1, 2:
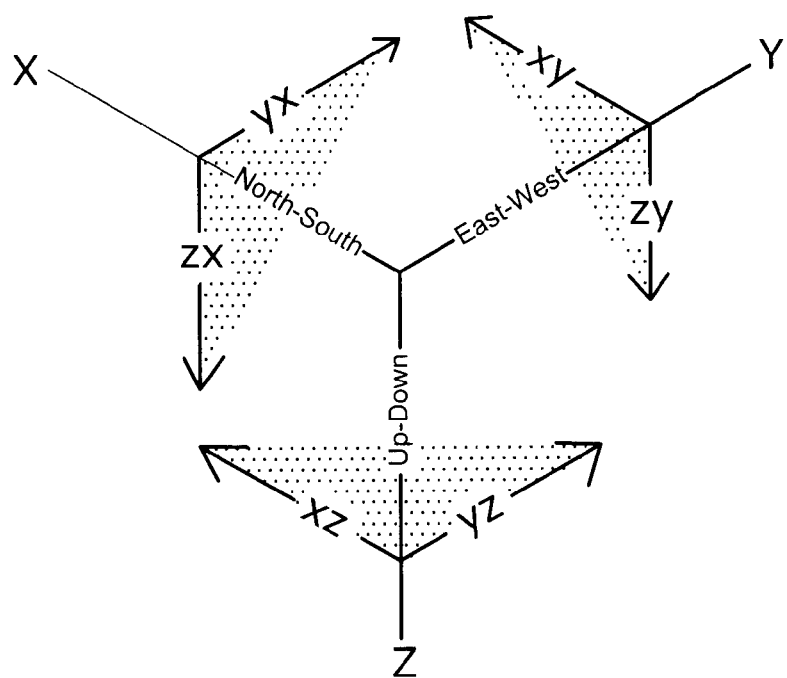
FIG. 1 is an isometric projection of a coordinate system for assessing the gravity field.
FIG. 2 is a nine-component matrix representing the full gravity gradient.
Figure 3:
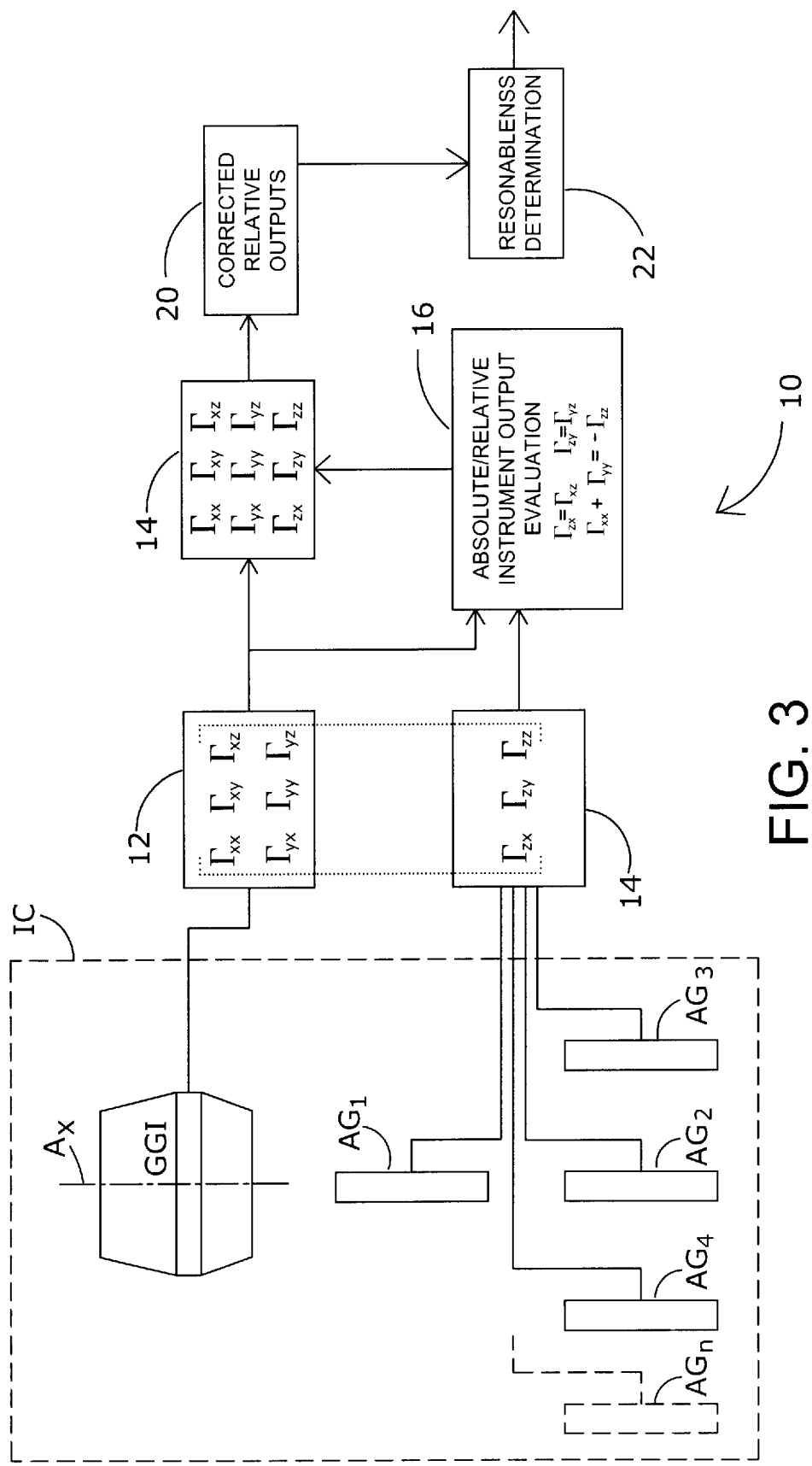
FIG. 3 is a schematic diagram of the overall system topology.

A complemented absolute/relative full-tensor gravity gradiometer system in accordance with the present invention is shown in FIG. 3 and designated generally therein by the reference character 10. As shown, the system 10 includes an instrument complex IC defined by a relative-type gravity gradiometer GGI and a group of absolute-type gravimeters $AG_1, AG_2,$ and $AG_3$. As illustrated in dotted-line illustration by the absolute-type gravimeter $AG_n$, the number of absolute-type gravimeters is not limited to that illustrated.

The relative-type gravity gradiometer GGI is preferably of the type sold by the Lockheed Martin corporation (Buffalo N.Y. USA) and disclosed in U.S. Pat. No. 5,357,802 issued Oct. 25, 1994 to Hofmeyer and Affleck and entitled "Rotating Accelerometer Gradiometer," the disclosure of which is incorporated herein. As shown within the instrument complex IC, the gravity gradiometer GGI is aligned with its input axis $A_x$ vertical. The gravity gradiometer GGI outputs the uppermost two rows of gravity tensor components: $\Gamma_{x,x}$ $\Gamma_{x,y}$ $\Gamma_{x,z}$ $\Gamma_{y,x}$ $\Gamma_{y,y}$ and $\Gamma_{y,z}$ as shown in functional block 12.

The absolute gravity instruments $AG_{1...n}$ are preferably falling-mass devices manufactured and sold by Micro-g Solutions of Erie Colo. 80516 USA under the FG5 designation and described in U.S. Pat. Nos. 5,351,122 and 5,892,151, both to T. Niebauer et al. The absolute gravity instruments $AG_1$ and $AG_2$ are arranged one above the other in an in-line relationship to measure variations in the vertical direction. The other absolute gravity instruments $AG_3$ and $AG_4$ are laterally spaced-apart from the axis of the absolute gravity instruments $AG_1$ and $AG_2$ and provide gradient information. The relative positioning of the absolute gravity instruments is shown in more detail on the left in FIG. 5. As shown by the functional block 14, the cluster of absolute-type gravimeters $AG_{1...n}$ output the lowermost row of gravity tensor components $\Gamma_{z,x}$ $\Gamma_{z,y}$ and $\Gamma_{z,z}$. As shown by the dotted-line brackets extending between functional block 12 and 14, the combined outputs of the various gravity instruments in the instrument complex IC define a composite full gravity tensor. However, the lowermost row of gravity components ($\Gamma_{z,x}$ $\Gamma_{z,y}$ and $\Gamma_{z,z}$) are derived from the absolute instruments while the upper two rows of gravity components ($\Gamma_{x,x}$ $\Gamma_{x,y}$ $\Gamma_{x,z}$ $\Gamma_{y,x}$ $\Gamma_{y,y}$ and $\Gamma_{y,z}$) are obtained from the relative instrument. The outputs of the relative and the absolute instruments are evaluated computationally in processing block 16 with the full tensor presented in block 18 and the corrected relative outputs provided at block 20. The corrected relative outputs are processed through a 'reasonability' block 22 to determine the veracity of the output as explained below in relationship to FIG. 4.

In general, gravity gradiometers of the type that utilize [utilizing] orbiting accelerometers have characteristic frequency-dependent sensitivity domains. In the case of the above described gravity gradiometer GGI, the accelerometers orbit the input axis $A_x$ at 0.25 Hz producing a 0.5 Hz output signal and first and second harmonics at 0.75 Hz and 1.0 Hz. In general, any noise sources consequent to scale factor differences between each pair of accelerometers (and their respective signal processing paths) that are not removed by common mode rejection techniques will appear in the instrument output. Additional noise sources include vibration from inertial platform-installed instruments, servo motors, residual servo feedback limit cycling, bearings, cooling fans, and electronic noise, including statistically indeterminate 'white' noise. Other noise sources include noises generated when the amplitude-controlled axial shake servo is deployed to vibrate the rotating accelerometer gradiometer assembly to uncover and compensate for residual accelerometer $g^2$ vibropendulous rectification errors left over after common mode rejection. The magnitude of other residual errors being predominate at the axial shake servo drive frequency as well as at the servo corner frequencies of the gradiometer-imbedded torque balance accelerometers.

In contrast to the relative gravity gradiometer, the absolute gravity instrument instruments $AG_{1...n}$ will not have noise and errors sources that are the same as the gravity gradiometer GGI, and, in general, will have simpler and more direct signal processing that will yield an output signal that has a high level of veracity.

The off-diagonal components of the gravity tensor are mathematically equal, i.e., $\Gamma_{x,z}=\Gamma_{x,z}$, $\Gamma_{y,z}=\Gamma_{z,y}$, and $\Gamma_{x,y}=\Gamma_{y,x}$ and the diagonal components have a zero-sum relationship $\Gamma_{z,x}+\Gamma_{y,y}+\Gamma_{z,z}=0$. Thus, the components $\Gamma_{z,x}$ and $\Gamma_{z,y}$ that are provided by the absolute instrument are nominally equal, respectively, to the components $\Gamma_{x,z}$ and $\Gamma_{y,z}$.

The outputs of each type of gravity instrument that are known to be equal from a mathematical standpoint are then compared, including comparison at the above mentioned critical frequencies, to provide difference information that can be use to assess the reasonableness of the output of the gravity gradiometer GGI, effect a compensation of the output of gravity gradiometer GGI, and identify situations in which the gravity gradiometer GGI is drifting out of a pre-determined specification so as to become unusable for data gathering.

Figure 4:
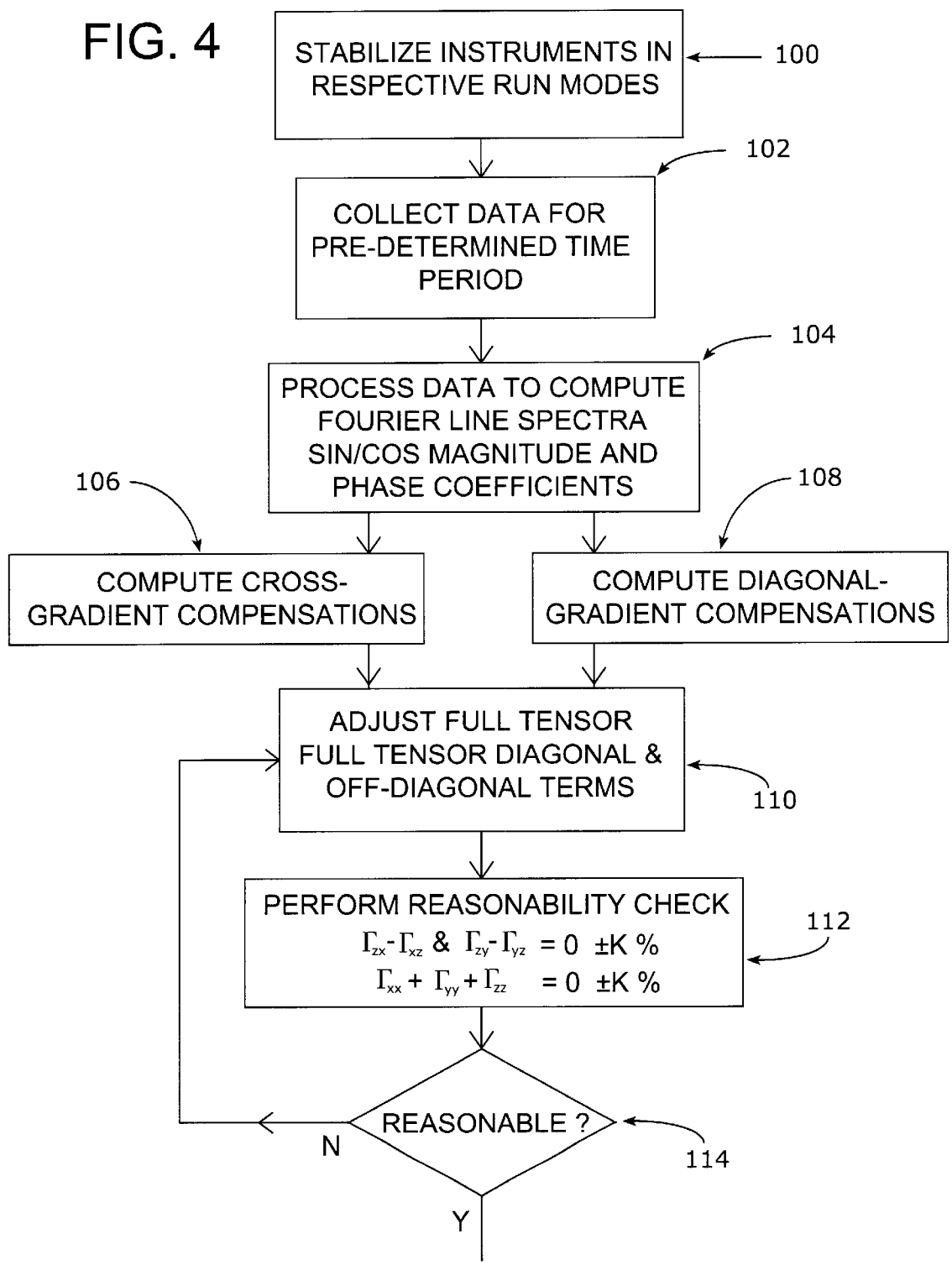
FIG. 4 is a flow diagram illustrating the process steps by which the system of FIG. 3 is operated.

As shown in the flow diagram of FIG. 4, the instrument complex IC is sequenced to and stabilized in their respective run modes at step 100 and, thereafter, data is collected from the relative and the absolute instruments AG for a selected time period at step 102. After an adequate data set is obtained, the data is processed at step 104 to compute Fourier line spectra including sin/cosine magnitude and phase coefficients. Thereafter, the cross-gradient is computed at step 106 and the diagonal gradient compensations are computed at step 108 and the various diagonal and off-diagonal terms adjusted at step 110. After adjustment, a reasonability test is conducted at step 112 for the values shown in FIG. 4 using a percentage variation limit value K. If the test at step 112 is determined to be reasonable, the output of the complemented devices is used; otherwise, the diagonal and off-diagonal terms are again adjusted in step 110 until the percentage variation is within limits.

Figure 5:
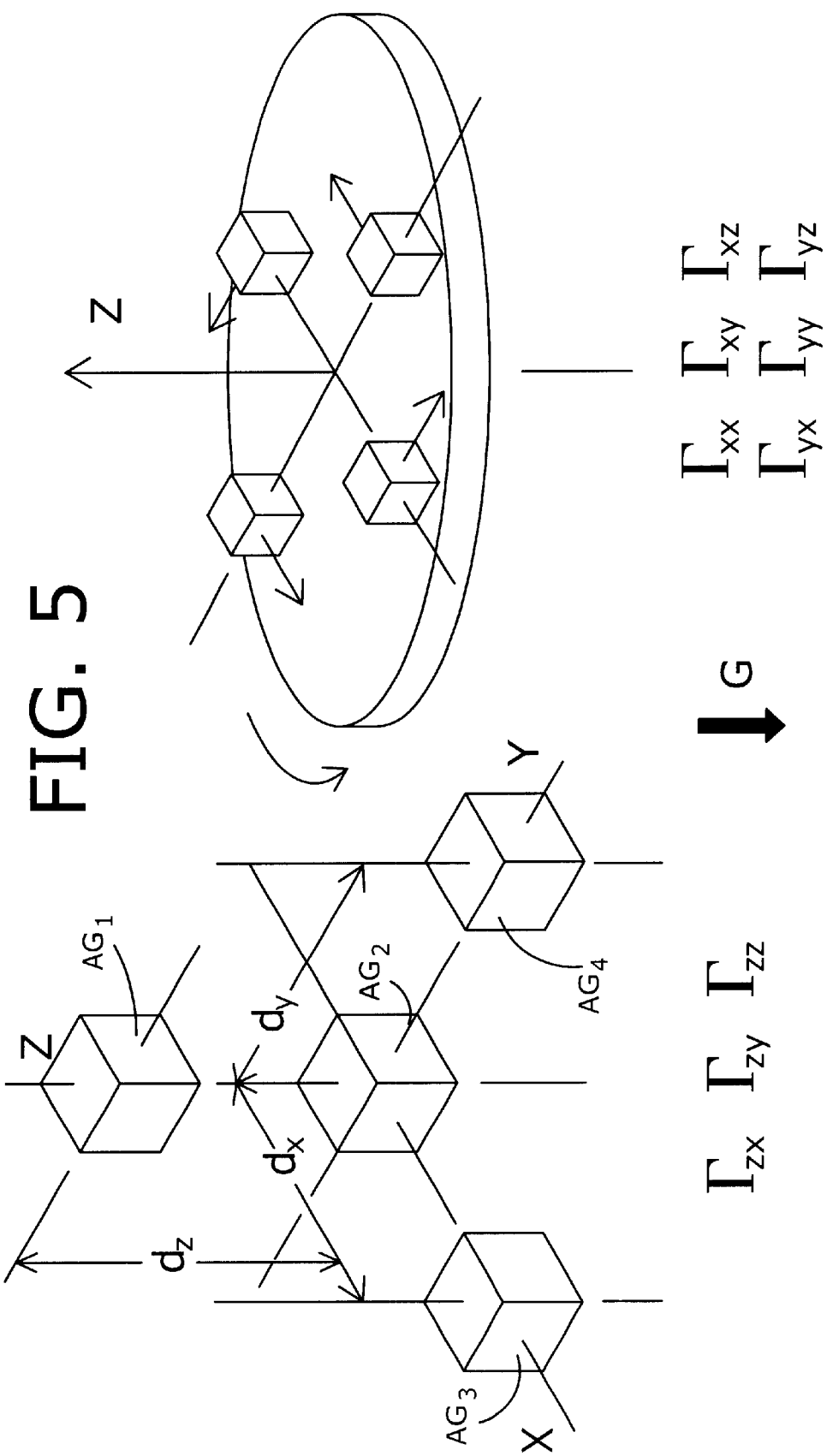
FIG. 5 presents a organization for a group of absolute gravity gravimeters in relationship to a relative gravity gradiometer with the components of the gravity tensor obtained by each device shown.

A suggested configuration for four absolute gravity instrument instruments $AG_{1...4}$ is shown on the left FIG. 5 in which two absolute gravity instruments $AG_1$ and $AG_2$ are aligned one above the other in the Z direction with two other absolute instruments $AG_3$ and $AG_4$ in the same plane as the lower of the two vertically aligned instruments $AG_2$. The gravity detecting accelerometers of the relative instrument GGI are shown on the right in FIG. 5.

The output of a relative instrument GGI contains noise spectrum peaks at the fundamental rotation frequency (0.25 HZ) and the harmonics thereof at 0.5, 0.75 and 1 Hz as well as the axial shake and corner frequencies of the accelerometer torque balance servos. The present invention quantifies and compensates for the GGI anomalous performance at these critical frequencies. Thus the absolute gravity gravimeter is used as a calibration reference to uncover and compensate for the relative instrument GGI excessive measurement noise errors at the critical frequencies. Because of the design differences between the two types of gravity instruments, the quiescent noise characteristics of the absolute and the relative instrument cross-gradient terms are different. The compensation is effected by quantifying the differences in output using either a Fast Fourier Transform (FFT) or a Discrete Fourier Transform (DFT). The FFT yield a somewhat coarser estimate compared to the DFT.

The computation processing of the present invention can be effected by discrete solid-state functional devices, by software- or firmware-controlled microprocessors or computers, by an application specific integrated circuit (ASIC), or by any combination thereof.

As will be apparent to those skilled in the art, various changes and modifications may be made to the illustrated complemented absolute/relative full-tensor gravity gradiometer system of the present invention without departing from the spirit and scope of the invention as determined in the appended claims and their legal equivalent.

What is claimed is:

1. An complemented absolute/relative full tensor gravity gradiometer comprising:

a pair of absolute gravity measuring devices for outputting at least a portion of the terms of the full gravity tensor, each absolute gravity measuring device of the falling-body type;

at least one gravity gradiometer for outputting at least a portion of the terms of the full gravity tensor, at least some of those terms corresponding to said terms outputted by the absolute gravity measuring device, the gravity gradiometer of the type having accelerometers orbiting about a spin axis; and means for comparing and adjusting various of the outputted terms provided by the absolute gravity measuring devices and the gravity gradiometer to provide corrected values.

* * * * *